3,537,864
TENDERIZATION OF MEAT BY MARINATION
AND REFRIGERATION
Stanley Magiera, Oak Forest Ave. and 66th St.,
Tinley Park, Ill.
No Drawing. Filed June 26, 1967, Ser. No. 648,942
Int. Cl. A23b 1/00, 1/06
U.S. Cl. 99—107                    1 Claim

ABSTRACT OF THE DISCLOSURE

A marinating solution for tenderizing packaged frozen or fresh meat without loss of moisture, flavor or texture.

---

The process of tenderizing meat by marination to be utilized in conjunction with packaging, refrigerating and freezing of selective cuts of meat, is best achieved by the employment of the following procedure.

The meat is selectively divided into size and cuts, with each cut immersed in a prepared marinating sauce of the composition hereinafter more fully described until each cut of meat is completely saturated.

The marinated meat is then placed in a sealed container, preferably a polyethylene bag containing an additional predetermined amount of the marinating sauce. The best predetermined amount of additional marinating sauce to be added to the container has been found to be in the ratio of approximately 5 oz. for each pound of meat to be tenderized. The sealed container is then refrigerated for two to four hours.

The tenderizing and flavoring of the meat continues to take place during shipment of the meat from the packer to the distributor or retailer. Freezing and storing of the marinated product will produce no adverse effects, nor will the marinating process overtenderize the product, thus breaking down its normal texture during this period.

The processed product may be then cooked without the necessity of thawing, at a temperature of approximately 300° F. until done, or at such temperature that results in an internal temperature corresponding to the type of cooking desired, such as rare, medium or well done.

The following test samples more fully describe the effect of this process, however, they are not intended to limit the beneficial results of the process but rather to be examples of the versatility afforded thereby.

A predetermined number of two-inch slices of pot roast cut from juxtaposed portions of a freshly butchered carcass were treated in the following manner:

The first slice of meat was untreated and sealed into a polyethylene container and refrigerated at 40° to 45° F.; a second piece of meat was placed in a polyethylene bag which contained three ounces of the marinated sauce and refrigerated at 40° to 45° F.; a third cut of meat was saturated with the marinating sauce and placed in a polyethylene bag and frozen without pre-refrigeration; the last cut of meat was saturated with the marinating sauce placed in a sealed polyethylene bag, with an additional three ounces of the marinating sauce, to increase the relative humidity of the air in the sealed container, and refrigerated at 40° to 45° F. for one hour.

Each of the cuts were simultaneously removed, roasted to an equal internal temperature and submitted to an expert panel for evaluation. The results were as follows:

The first cut was evaluated at a sub-minimal score considering its flavor, texture, moisture and tenderness; the second cut was evaluated at a slightly higher percentage with the marination adding to the flavor and tenderness of the product; the third cut scored on an equal evaluation with respect to the second cut. The fourth cut showed a vast and satisfying improvement in flavor, texture, moisture and tenderness, attributed to the marinating sauce saturation and the increased relative humidity of the air in the container produced by the additional marinating sauce during refrigeration.

By repeating these tests with variations, it has been determined that the marinating of the meat followed by immediate freezing of the treated meat produced no beneficial results. The saturation of the meat with the marinating sauce improved its flavor and tenderness to a limited degree achieved through the limited marination effected during the cooking period.

The most pronounced tenderizing effected was achieved by marinating the meat and refrigerating the same with additional marinating sauce, for a given period of time, permitting the total effects of the marination to be realized.

From these tests it was apparent that the tenderizing effects of the marinating process was either inhibited or significantly retarded by the immediate freezing of the meat after marination. The result was illustrated by the third example in which the saturated meat was permitted to thaw during its cooking period, permitting the marination to effect the texture of the meat only during that limited period. The last test clearly illustrated that where the meat is saturated and then followed with a period of refrigeration with additional marinating sauce, before freezing, the objective effect of the marination was fully realized and enhanced the product.

The preferred composition of the marinating sauce consists of one part each of starch, Bonito powder and mushroom powder, having added thereto one and one-half parts of salt, two parts of vegetable oil, six parts of soy powder and twelve parts of sugar. The dried ingredients are then mixed with a sufficient amount of water to produce fluid marinating sauce capable of quickly saturating a cut of meat as well as supplanting the dissipating fluid of the meat during the refrigerating period.

The various advantages and objects of the invention may be accomplished by modifications of the particular method and embodiment specifically described herein, and it is intended that the appended claim shall include all equivalent arrangements and methods coming within their call.

Having thus described my invention, what I claim as new and desire to protect by Letters Patent is:

1. In a process for tenderizing meat before freezing, the steps include
   (a) immersing the meat in a marinating liquid consisting of one part each of starch, Bonito powder and mushroom powder, mixed with one and one-half parts of salt, two parts of vegetable oil, six parts of soy powder, and twelve parts of sugar, having added thereto a sufficient amount of water to produce the liquid, (b) sealing the marinated meat in a container with approximately 5 oz. of additional marinating liquid to each pound of meat,
(c) and refrigerating the container at 40° F. to 45° F. for two to four hours before freezing.

References Cited

UNITED STATES PATENTS 3,207,608　9/1965　Brown et al. _____ 99—107

OTHER REFERENCES

Lord, "Everybody's Cook Book, 1924, published by Harcourt, Brace and Company, New York, pp. 469, 671, 672, and 673.

HYMAN LORD, Primary Examiner

U.S. Cl. X.R.

99—194